United States Patent [19]

Yaguchi et al.

[11] Patent Number: 4,928,381

[45] Date of Patent: May 29, 1990

[54] AUTOMATIC TOOL CHANGER

[75] Inventors: Yoshinori Yaguchi; Masahiro Kubota; Masamitsu Nakaminami, all of Yamatokoriyamashi, Japan

[73] Assignee: Kabushiki Kaisha Mori Seiki Seisikusho, Japan

[21] Appl. No.: 338,221

[22] Filed: Apr. 14, 1989

[30] Foreign Application Priority Data

Apr. 15, 1988 [JP] Japan .................................. 63-93867
Sep. 12, 1988 [JP] Japan ................................ 63-228092

[51] Int. Cl.⁵ .......................................... B23Q 3/157
[52] U.S. Cl. ........................................ 29/568; 408/35
[58] Field of Search ............................. 29/568; 408/35

[56] References Cited

U.S. PATENT DOCUMENTS

| 2,997,901 | 8/1961 | Keck et al. ............................ 408/35 |
| 3,114,964 | 12/1963 | Bramson ................................ 29/568 |
| 3,133,349 | 5/1964 | Riedel .................................... 29/568 |
| 4,561,415 | 12/1985 | Willot .................................... 408/35 |
| 4,583,894 | 4/1986 | Mitchell ................................ 29/568 |

FOREIGN PATENT DOCUMENTS

| 166936 | 7/1987 | Japan ..................................... 29/568 |
| 348594 | 10/1960 | Switzerland ......................... 408/35 |
| 1073681 | 6/1967 | United Kingdom ................. 408/35 |
| 1286702 | 8/1972 | United Kingdom ................. 29/568 |

Primary Examiner—Daniel Howell

[57] ABSTRACT

An automatic tool changer includes a main spindle having a bore inside, a chuck provided at an opening of the main spindle, a plurality of tools accommodated in the bore of the main spindle, wherein the tools are individually slidable axially of the main spindle, means for pushing the tools toward the opening of the main spindle, thereby replacing a first tool on the chuck with a second tool accommodated in the bore of the main spindle.

10 Claims, 6 Drawing Sheets

AUTOMATIC TOOL CHANGER

BACKGROUND OF THE INVENTION

The present invention relates to a tool changer for use in automatic machine tools such as an NC machinery, and more particularly to a tool changer for exchanging a used tool on a spindle with a fresh one stored within the body of the spindle.

It is known in the art to employ an automatic tool changer for an NC machinery so as to avoid disrupting the operation when a used tool on the main spindle is exchanged with a fresh tool stored in the magazine. The known automatic tool changer has a fairly complicated mechanism, which includes a tool carrying arm for shifting the fresh tool from the magazine to an changer head, which then carries and mounts the fresh tool on the main spindle.

The tool carrying arm requires a relatively large working space for itself and related part members thereby increasing the sizes and prices of the tool changers.

In addition, locating the tool carrying arm exactly at a position where the tools are exchanged may be difficult and the work involved in tool locating is time-consuming. In trying to finish the tool location in a short period of time, the precision is often sacrificed. In tapping, for example, a hole is preformed by a drill, wherein the used tool is the drill, and a fresh tool is a tap. The positions of the drill and the tap are the same with respect to the workpiece. However, in order to avoid colliding with the workpiece the drill is shifted to a position where the drill is exchanged with the tap. After the drill is exchanged with the tap, the tap is shifted to a working position. In this way the known tool changers require the travel of the tool carrying arm, which consumes time. The mechanical movements generate frictional heat in the feed screws, and wear the part members engaged in the tool exchange. The tool exchange is a highly sophisticated work. Even minor inadequacy leads to imprecise location of the fresh tool. If the tool exchange takes a long time, it is particularly disadvantageous when a routine work is done with a small tool. The tool exchange should be finished as soon as possible.

The present invention is directed toward an improved tool changer which solves the problems encountered by the known tool changers discussed above. Thus, an object of the present invention is to provide an automatic tool changer capable of exchanging one tool with another in a short period of time.

Another object of the present invention is to provide an automatic tool changer capable of locating a replacing tool at an exact position with respect to the workpiece.

SUMMARY OF THE INVENTION

According to the present invention, a tool changer for use in automatic machine tools comprises a main spindle having and internal bore, a chuck provided at an opening of the main spindle, and a plurality of tools accommodated in the bore of the main spindle, wherein the tools are individually slidable axially of the main spindle, with means for pulling the tools out of the chuck and pushing the tools toward the opening of the main spindle, thereby replacing a first tool on the chuck with a second tool accommodated in the bore of the main spindle.

Other objects and advantages of the present invention will become more apparent from the following detailed description, when taken in conjunction with the accompanying drawings which show, for the purpose of illustration only, embodiments in accordance with the present invention.

DETAILED DESCRIPTION OF THE PREFERRED EMBODIMENTS

Figure 1:
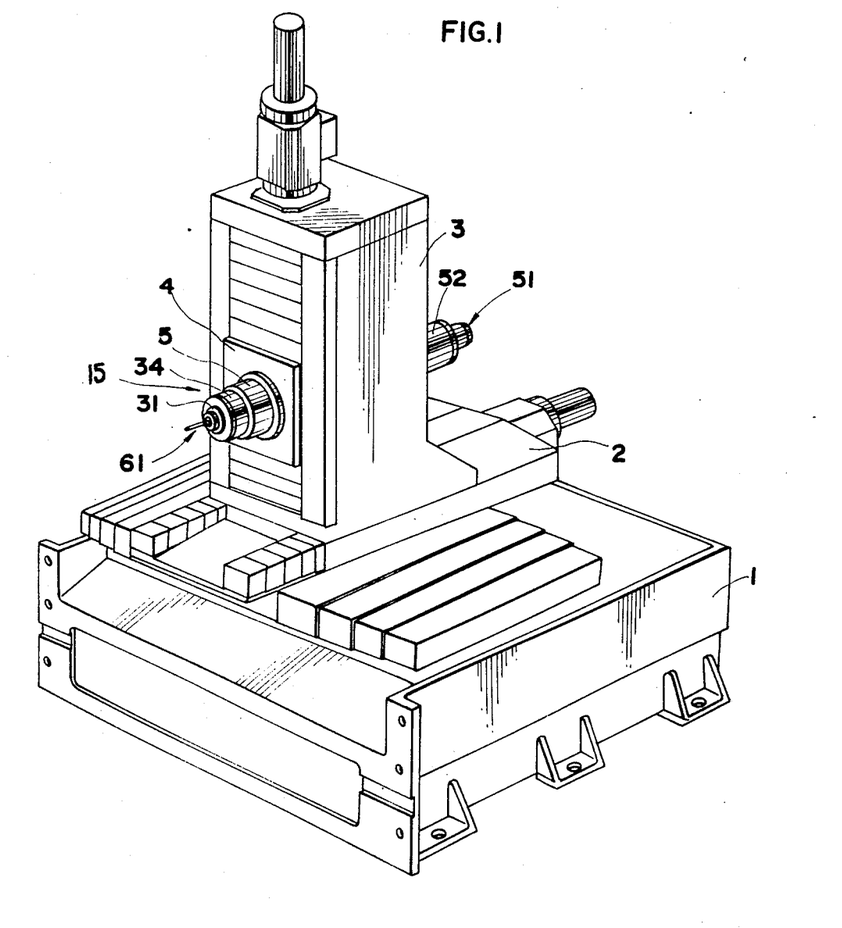
FIG. 1 is a perspective view showing a state in which a tool changer embodying the present invention is loaded in an NC machine tool.
Figure 2:
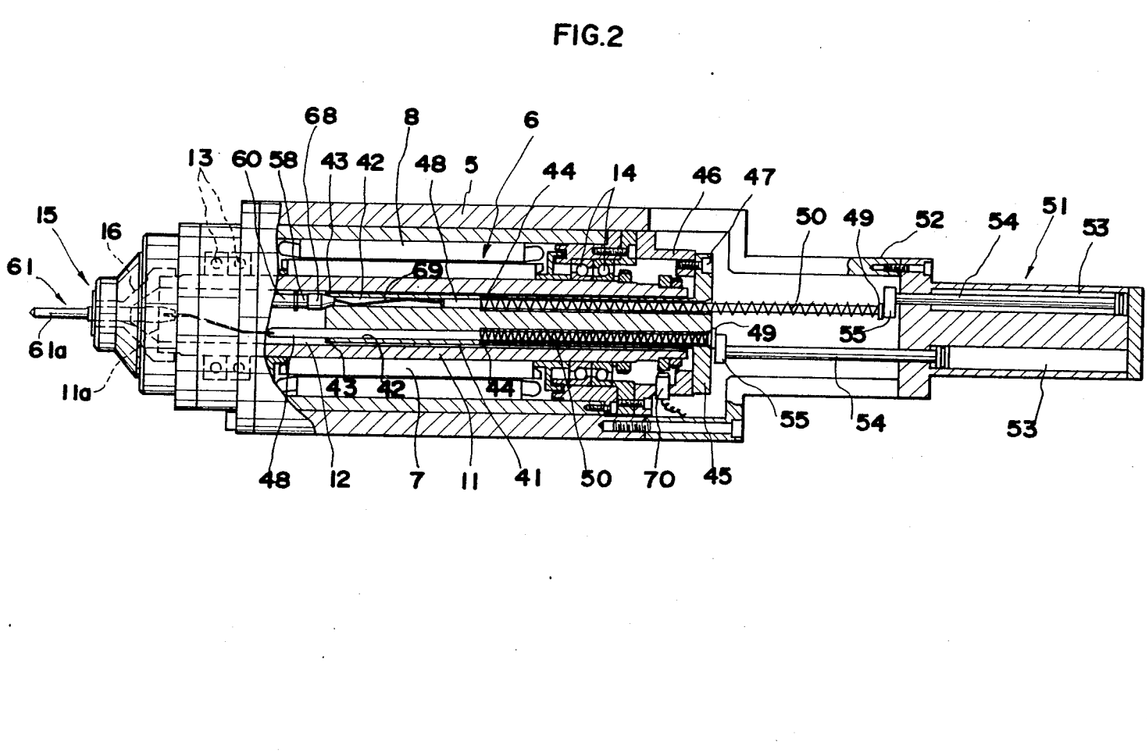
FIG. 2 is a partly cross-sectional front view showing the tool exchanger of FIG. 1.

FIG. 1 shows an NC machine tool incorporating an example embodying the present invention. The NC machine includes a bed 1, a carriage 2 movable axially of the bed 1, a column 3 movable perpendicularly to the length of the bed 1, a headstock 4 slidably mounted on the column 3, and a main spindle head 5 fixed to the headstock 4, which, as shown in FIG. 2, is a hollow cylinder with the main spindle head 5 including a spindle motor generally designated by the reference numeral 6.

The main spindle head 5 carries a main spindle 11 having a bore 12 through bearings 13 and 14. The main spindle 11 is integrally surrounded by a rotor 7 of the spindle motor 6, thereby effecting the unitary motion of the spindle 11 and the rotor 7. The motor 6 has a stator 8 fixed to the main spindle head 5.

Figure 3:
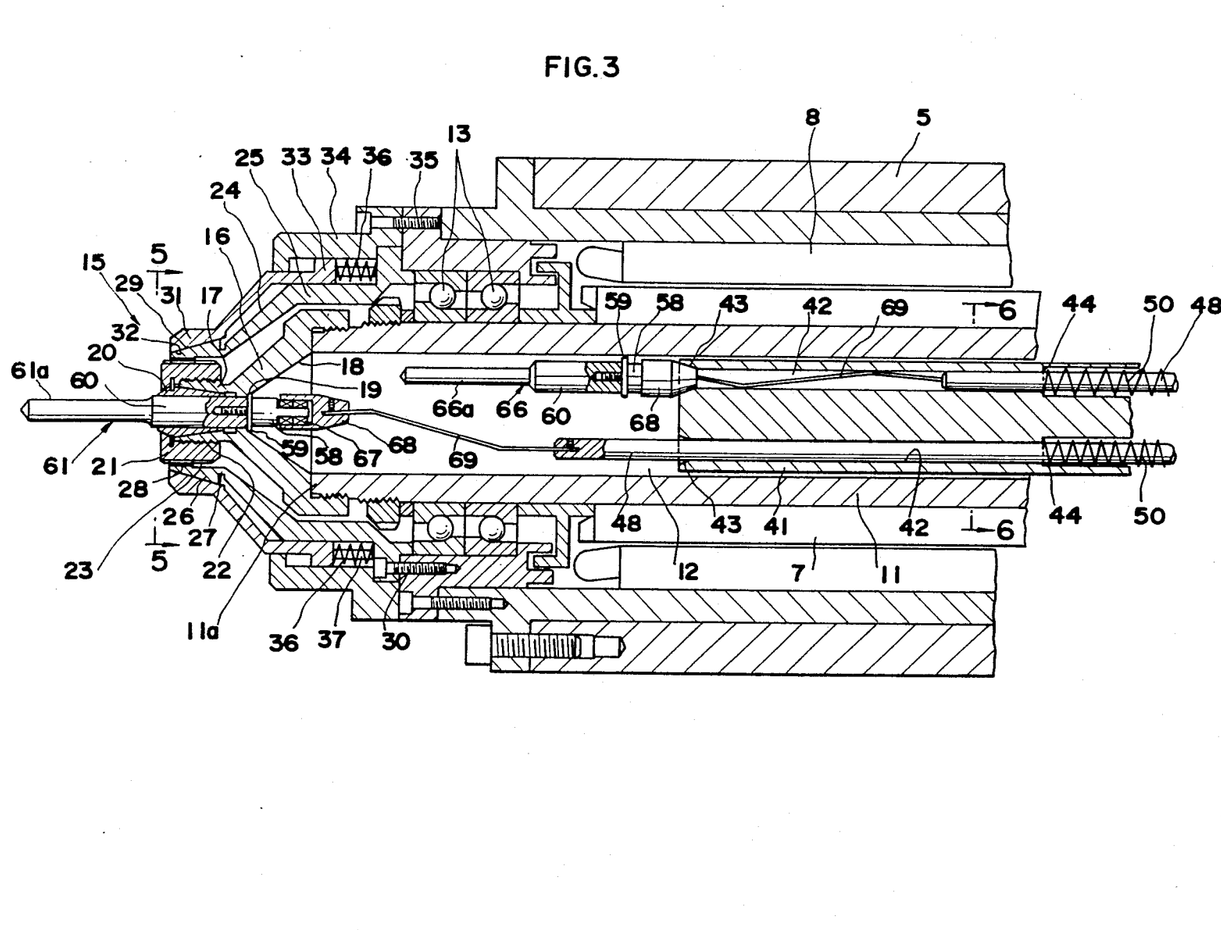
FIGS. 3 and 4 are cross-sectional views on enlarged scale respectively showing a main part of the tool changer embodying the present invention.
Figure 4:
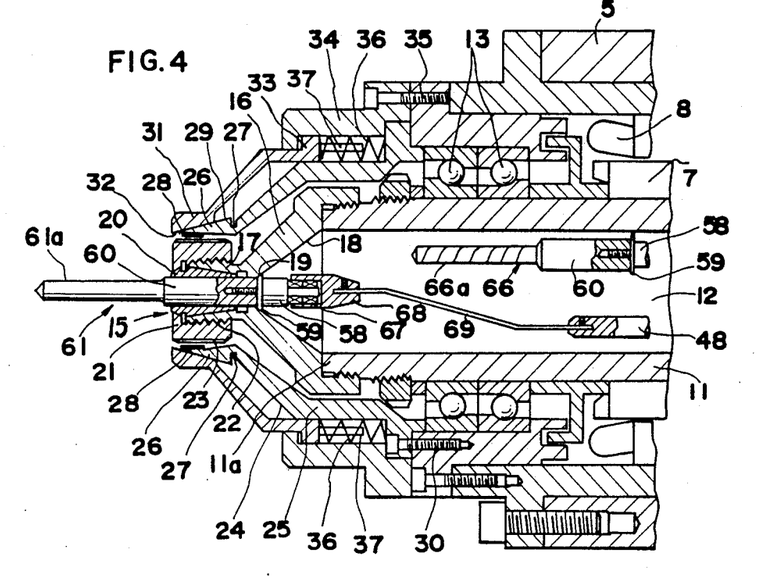

A collet chuck generally designated by the reference numeral 15, includes a chuck 16 fitted into a hole 11a of the main spindle 11. As best shown in FIGS. 3 and 4, the chuck 16 includes a cylindrical tool holder 17 for maintaining a tool, a taper-walled hole 18 for facilitating the movement of a replacing tool, and an abutment 19 which prevents the replacing tool from excessively extending out of the collet chuck 15. A first collet 20 fits a taper hole in the tool holder 17. A tool is secured to the tool holder 17 by a nut 21, which screws on the threaded portion 22 of the tool holder 17. The nut 21 is provided with periperally disposed axially extending serrations 23.

A second collet 24 secures the nut 21 to the tool holder 17, with the second collet 24 including a cylindrical portion 25, eight split ribs 26 and a ring-shaped recess 27 cut at the root portions of the split ribs 26. Each rib 26 is provided with serrations 28 engageable with the serrations 23 in the nut 21. The second collet 24 has a taper surface 29, and has a cylindrical portion 25 fixed to the main spindle head 5 by screws 30. The ring-shaped recess 27 allows for a resiliency of the split ribs 26. The second collet 24 is fixedly pressed against the nut 21 by a ring 31, and has a tapered wall 32 kept in contact with the taper surface of the split ribs 26. The ring 31 includes a piston portion 33 disposed between the cylindrical portion 25 of the second collet 24 and an inner wall of a cylinder 34 fixed to the main spindle head 5 by a screw 35. The piston portion 33 is normally biased forward by a spring 36. When the piston portion 33 is pushed forward by the spring 36, the split ribs 26 are released from the nut 21 (FIG. 4).

Figure 5:
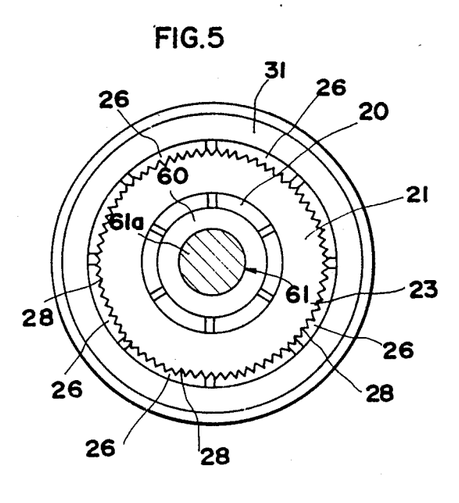
FIG. 5 is a cross-section taken along the lines 5—5 in FIG. 3.
Figure 6:
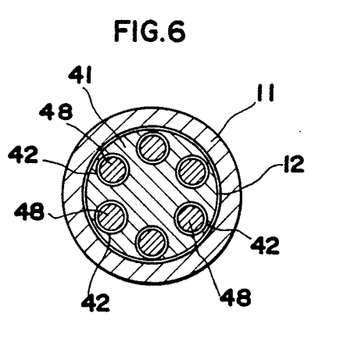
FIG. 6 is a cross-section taken along the lines 6—6 in FIG. 3.

When the piston portion 33 is moved rearwardly against the spring 36 under hydraulic or pneumatic pressure, the split ribs 26 are tightened by the ring 31 as best shown in FIGS. 3 and 5. As a result, the serrations 23 and 28 of the split-ribs 26 and the nut 21 come into engagement, thereby preventing the nut 21 from rotation such that it is movable in an axial direction. The piston portion 33 is provided with a stop pin 37 whereby a possible excessive tightening-up of the split ribs 26 is prevented.

Tools are retained in a cylindrical tool retainer 41, which includes a plurality of guide bores 42 (the illustrated embodiment has six bores) disposed at equal intervals around a periphery of the tool retainer 41. Each bore 42 is diverged at an entrance 43 thereof in which a tool is held, and is provided with a ring-shaped shoulder 44 at a rear section thereof, which receives a return spring 50.

The tool retainer 41 is releasably inserted into the bore 12 of the main spindle 11, and a flange 45 is fastened to the main spindle head 5 through a cover 46 by bolts 47. The tool retainer 41 includes guide bores 42 in which working rods 48 are slidably accommodated. Each guide bore 42 is stepped at 44, and each working rod 48 is provided with a flange 49 at its terminating end. A spring 50 inserted between the step 44 and the flange 49 normally biases the working rod 48 rearward.

A cylinder housing generally designated by the reference numeral 51 accommodates a number of pneumatic cylinders 53 corresponding to that of the working rods 48, with the pneumatic cylinders 53 having piston rods 54 equipped with pushers 55 at their top ends. The piston rods 54 push the working rods 48 forward against the springs 50.

The tool retainer 41 contains a plurality of tools, only two of which are illustrated in the drawings and generally designated by the reference numerals 61, 66, with each of the tool 61, 66 having a shank 60 of the same configuration but has its own blade 61a different from each other. For tapping use, for example, a centering drill 61a, a drill 66a, a chamfering edge (not shown), and a tap (not shown) will be exchanged one after another.

Each tool is releasably fixed to a shank holder 58 having a flange 59 in a known manner such as by a thread-to-thread method. As mentioned above, the shanks 60 of the tools 61 to 66 are of the same configuration, which allows the shank holders 58 to have the same configuration. Each shank holder 58 is rotatively connected to a coupler 68 through bearings 67, and the flange 59 comes into abutment with the shoulders 19 of the chuck 16, thereby positioning the tool at its working position.

Each tool 61, 66 is connected to the working rod 48 by a conventional wire 69 which is secured to the coupler 68 at one end, and to the working rod 48 at the other end.

When the working rod 48 is fully withdrawn, the wire 69 is equally pulled into the bore 42 until the coupler 68 comes into abutment with the entrance 43 of the bore 42. When the working rods 48 are fully protruded through the bore 42, the tools are individually protruded until their blades come out through the collets 20 to predetermined lengths. At this stage the collets 20 hold the shanks of the individual tools. Then the main spindle 11 is driven to enable the tools to work as a drill, a chamfer, or a tap. While the tools are working, the piston portions 33 move forward under the action of the springs 36, thereby relaxing the split ribs 26 to allow the nut 21 to be freed therefrom.

As shown in FIG. 2, a sensor 70 measures the rotations of the main spindle 11. In tapping, for example, the sensor 70 is helpful in synchronizing the rotation of the main spindle 11 with the speed of feed thereof.

An example of the operation will be described:

In FIG. 3 shows that a tool 61 is a used tool which has finished its work, and a tool 66 is a fresh tool to replace with the tool 61. At this stage the cylinder 34 is supplied with pneumatic or hydraulic pressure, thereby enabling the piston portion 33 to withdraw against the springs 36. The ring 31 progressively tightens up the split ribs 26 of the second collet 24 in accordance with the movement of the piston portion 33, thereby enabling the serrations 28 of the split ribs 26 to engage the serrations 23 of the nut 21 (FIG. 5). The stop pin 37 works a safety device whereby the ring 31 is prevented from tightening the split ribs 26 excessively. In this way the nut 21 is stopped from rotation but is movable in the axial direction. The piston rods 54 of the pneumatic cylinders 53 are withdrawn in a rearward direction.

Then, the main spindle 11 is reversely rotated at low speed (in a clockwise direction when viewed from the left-hand side in FIG. 3), thereby enabling the nut 21 to become loose on the chuck 16. Thus the nut 21 is allowed to axially move and untighten the collet 20, thereby freeing the used tool 61 from the collet 20 and withdrawing the used tool 61 into the guide bore 42 under the action of the spring 50 and the wire 69 until the used tool 61 rests on the entrance 43 of the guide bore 42. Then the main spindle 11 is stopped.

In response to the stoppage of the main spindle 11, the next step starts with the energizing of the pneumatic cylinder 53 which moves the piston rod 48 in a forward direction. The fresh tool 66 is pushed out of the entry 43 by the piston rod 48 by the wire 69, and is passed through the tool holder 17 through the taper-walled hole 18. The tool 66 stops when its blade 66a protrudes through the collet 20 to a predetermined length. At this stage the main spindle 11 is rotated in a counter-clockwise direction when viewed from the left-hand side in FIG. 3, thereby enabling the nut 21 to rotate and move axially so as to tighten up the collet 20, whereby the tool 66 is held by the collet 20.

When the tool 66 is fixed by the collet 20, the pneumatic or hydraulic pressure is evacuated from cylinder 34, and as shown in FIG. 4, the piston portion 33 is moved forward by the spring 36 thereby enabling the ring 31 to untighten the split ribs 26. The split ribs 26 are elastically deformed from the ring-shaped recess 27, thereby releasing the split ribs 26 from the nut 21. In this way the serrations 23 and 28 are disengaged from each other.

Then the main spindle 11 is rotated at high speed to drive the tool 66 so as to enable it to perform its own function. The wire 69 and the working rod 48 remain inoperative regardless of their connection to the tool 66 because of the presence of the bearings 67, and the other tools also remain out of operation.

The same procedures follow from one tool to another.

In the illustrated embodiment the return spring 50 and the cylinders are used to shift the tools but any other means can be used.

It is possible to accommodate the tools 61, 66 in the tool retainer 41, the wires 69, the working rods 48, the return springs 50 and the cylinder housing 51 in a cassette, which can be housed in the bore 12 of the main spindle.

Figure 7:
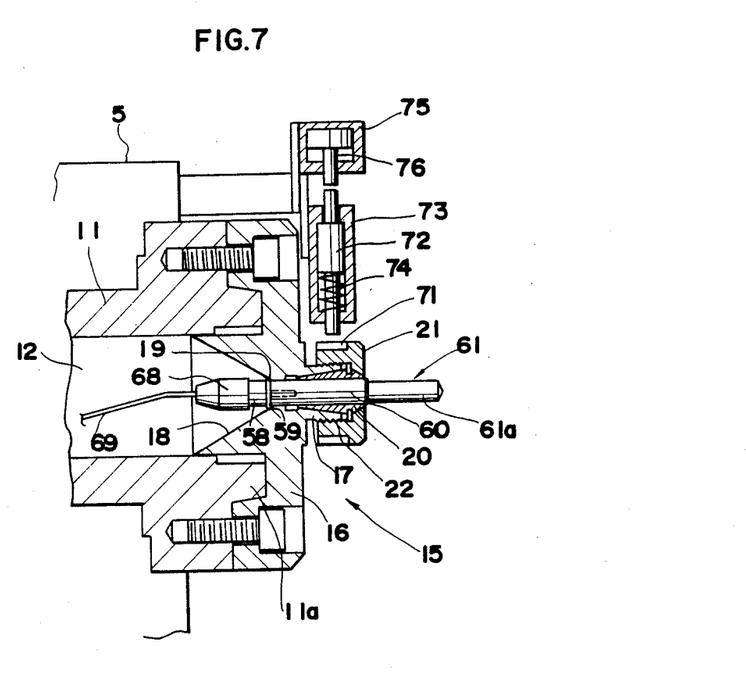
FIG. 7 is a cross-sectional view showing a modified version of the embodiment.

Referring to FIG. 7, a modified version of the embodiment will be described:

This embodiment is characterized in that the nut 21 is provided with recesses 71 equally spaced along its periphery adapted to receive a stop pin 72, thereby preventing the nut 21 from rotating in accordance with the rotation of the main spindle 11.

The stop pin 72 is housed in a housing 73 provided in the main spindle head 5 such that it is normally kept away from the nut 21 by a spring 74. A pneumatic cylinder 75 includes a piston rod 76 cooperable with stop pin 72 projecting toward the nut 21 a biasing force of the spring 74. The stop pin 72 fits any of the recesses 71 thereby to stop the nut 21 from rotation as described above although the nut 21 remains movable in the axial direction. In this situation the main spindle 11 is rotated at low speed in a clockwise or counter-clockwise direction, thereby tightening or untightening the nut 21.

The chuck provided in the opening 11a of the main spindle 11 is not limited to the collet chuck 15 specified above but can be substituted by various types of chucks.

Figure 8:
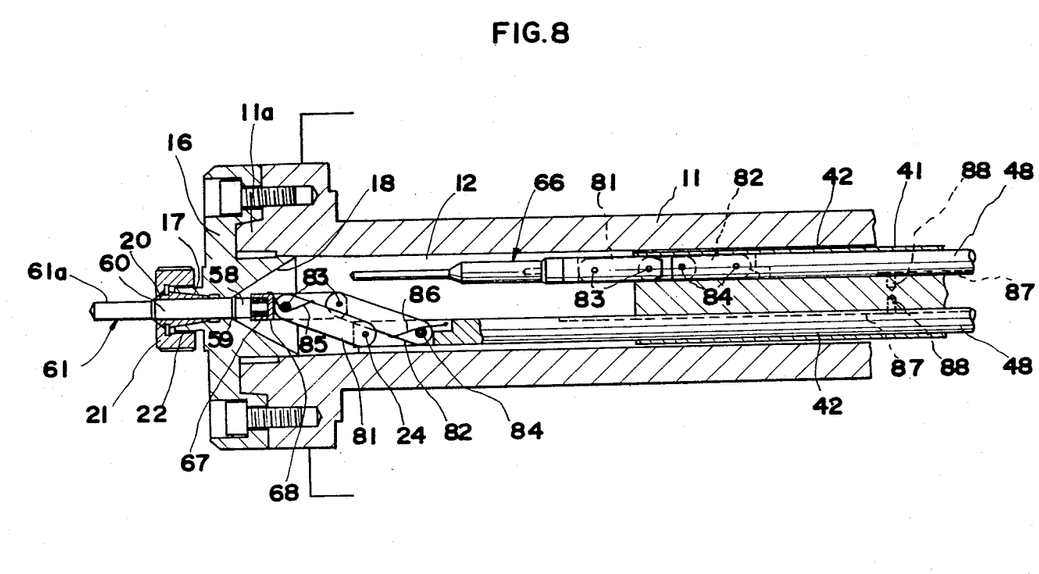
FIG. 8 is a cross-sectional view showing a further modified version of the embodiment.

FIG. 8 shows an example employing a crank unit which includes a pair of links 81 and 82 which are respectively connected to the coupler 68 by pivots 83 at one end, and connected to the working rod 48 by pivots 84 at the other end. When the tool is withdrawn at an inoperative position, the working rod 48, the links 81, 82, the coupler 68 and the tool are coaxially aligned. When the tool is pushed toward its operation position by the working rod 48, the links 81 and 82 are rotated in a clockwise direction in FIG. 8, thereby enabling the tool to shift axially with the main spindle 11 against springs 85 and 86. Each working rod 48 is provided with a groove 87, which receives a stop pin 88 so as to prevent the working rod 48 from rotation though it remains movable axially with the main spindle 11. Under this arrangement of FIG. 8 it is ensured that the tool is shifted in parallel with the axis of the main spindle 11.

As is evident from the foregoing description, one of the advantages is that the tool exchange is carried out instantly without having intermediate movements of a tool carrying arm and its related part members. Another advantage is that it is not necessary to position the main spindle and the tool exchange arm at a place where the tool exchange takes place, thereby ensuring the precise location of a fresh tool. The tool changer can be a compact size because the main spindle accommodates all the tools within its inner bore, thereby eliminating the necessity of preparing an accommodation space around the main spindle. The present invention allows all the tools and related part members to accommodate in a cassette. The cassette system facilitates the replacement of tools. Other advantage of the present invention is that the tool changer is simplified in construction, and economical in production.

What is claimed is:

1. An automatic tool changer for exchanging one tool with another, the automatic tool changer comprising:
   a main spindle having an internal bore;
   a chuck provided at an opening of the main spindle;
   a plurality of tools accommodated in the internal bore of the main spindle, wherein the tools are individually slidable axially of the main spindle: and
   means for pulling the tools out of the chuck and pushing the tools toward the opening of the main spindle, thereby replacing a first tool on the chuck with a second tool accommodated in the bore of the main spindle.

2. An automatic tool changer for exchanging one tool with another, the automatic tool changer comprising:
   a hollow main spindle rotatably carried on a main spindle head;
   a tool retainer inserted into the hollow main spindle, thereby insuring that the tool retainer is accommodated in the main spindle head:
   a chuck provided in an opening of the hollow main spindle, the chuck including a cylindrical tool holder and means for leading the tool to the tool holder;
   a plurality of tools having shanks of the same shape accommodated in the cylindrical tool retainer such that the tools are equally spaced along the periphery thereof and the tools are individually slidable axially of the retainer; and
   tool shifting means disposed in the tool retainer for enabling a replacing tool to move forward from the tool retainer until a tool blade protrudes through the cylindrical tool holder to a predetermined length and for moving the used tool rearwardly from the cylindrical tool holder to the tool retainer.

3. A tool changer as defined in claim 2, wherein the tool shifting means comprises working rods slidably disposed in individual axially extending guide bores provided in the tool retainer, wires having a first end respectively connected to rear ends of the individual tools and a second end respectively connected to forward ends of the working rods, bearing means for rotatably supporting the wires and the tools, return spring means for withdrawing the working rods to a rearward position, and means for pushing the working rod forward against the return spring means and enabling the replacing tool to move to a position where the replacing tool is caught by the chuck.

4. A tool changer as defined in claim 2, wherein the tool shifting means includes working rods slidable disposed in individual axially extending bores provided in the tool retainer and parallel crank means for respectively connecting the individual tools with the working rods.

5. A tool changer as defined in any of claims 2, 3 or 4, wherein the chuck is a collet chuck tightened or untightened by a nut, the nut being adapted for prevention from rotation by a fixing means disposed at the main spindle head while being kept movable axially.

6. A tool changer as defined in claim 5, wherein the plurality of tools accommodated in the tool retainer are contained in a cassette together with the tool shifting means.

7. A tool changer as defined in claim 6, wherein the main spindle is rotated by a spindle motor fitted in the main spindle head, and wherein the motor has a rotor integrally surrounding the main spindle.

8. A tool changer as defined in any one of claims 2, 3, or 4, wherein the plurality of tools accommodated in the tool retainer are contained in a cassette together with the tool shifting means.

9. A tool changer as defined in any one of claims 2, 3 or 4, wherein the main spindle is rotated by a spindle motor fitted in the main spindle head, and wherein the motor has a rotor integrally surrounding the main spindle.

10. A tool changer as defined in claim 9, wherein the chuck is a collet chuck tightened or untightened by a nut, the nut being adapted for prevention from rotation by a fixing means disposed at the main spindle head being kept movable axially.

* * * * *

UNITED STATES PATENT AND TRADEMARK OFFICE
CERTIFICATE OF CORRECTION

PATENT NO. : 4,928,381

DATED : May 29, 1990

INVENTOR(S) : Yaguchi et al.

It is certified that error appears in the above-identified patent and that said Letters Patent is hereby corrected as shown below:

TITLE PAGE

[75] Inventors: Yoshinori Yamaguchi; Masahiro Kubota; Masamitsu Nakaminami, all of Yamatokoriyamashi, Japan

[73] Assignee: Kabushiki Kaisha Mori Seiki Seisakusho, Japan

Signed and Sealed this

Sixteenth Day of June, 1992

Attest:

DOUGLAS B. COMER

Attesting Officer

Acting Commissioner of Patents and Trademarks